United States Patent [19]
Squire et al.

[11] 3,819,383
[45] June 25, 1974

[54] SUPER-SENSITISING COMBINATION IN PHOTOGRAPHIC SILVER HALIDE EMULSION

[75] Inventors: Elaine Josephine Squire; Aaron David Ezekiel, both of Ilford, England

[73] Assignee: Ilford Limited, Ilford, England

[22] Filed: July 11, 1972

[21] Appl. No.: 270,702

[30] Foreign Application Priority Data
July 12, 1971  Great Britain .................... 32615/71

[52] U.S. Cl. ..................................... 96/124, 96/137
[51] Int. Cl. ............................................... G03c 1/14
[58] Field of Search .............................. 96/124, 137

[56] References Cited
UNITED STATES PATENTS

| | | | |
|---|---|---|---|
| 3,573,920 | 4/1971 | Hiller | 96/124 |
| 3,660,099 | 5/1972 | Sato et al. | 96/124 |

*Primary Examiner*—J. Travis Brown
*Attorney, Agent, or Firm*—Wenderoth, Lind & Ponack

[57] ABSTRACT

The present invention relates to a photographic silver halide emulsion which comprises a super-sensitising combination, which consists of (I) a 5-alkoxy-naphthothia-zole-2-benzothiazole or selenazole-trimethinecyanine and (II) a bis-2-benzothiazole-trimethinecyanine.

4 Claims, 2 Drawing Figures

SUPER-SENSITISING COMBINATION IN PHOTOGRAPHIC SILVER HALIDE EMULSION

Photographic silver halide emulsions have a certain natural sensitivity to light but this is restricted to a short range of wavelengths in the ultra-violet and/or blue regions of the spectrum. The effect of incorporating a sensitising dye is to impart to the emulsion sensitivity to light of other wavelengths. It has been known for some years that by incorporating in the emulsion, together with the sensitising dye, a second substance which may or may not itself be a sensitising dye, there may sometimes be imparted to the emulsion and additional sensitivity beyond that which can be regarded as the sum effect of the separate substances. Combinations of sensitising dye and other substances which give this better result are known as super-sensitising combinations.

According to the present invention there is provided a photographic silver halide emulsion which comprises a supersensitising combination which consists of a sensitising dye of the general formula

I

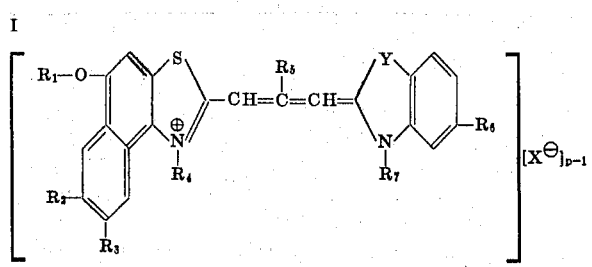

wherein $R_1$, $R_5$ and $R_7$ are each lower alkyl groups, $R_2$ and $R_3$ are each hydrogen atoms or lower alkoxy groups, $R_6$ is a hydrogen, chlorine or bromine atom or a lower alkyl group, $R_4$ is a lower alkyl group or a substituted lower alkyl group, Y is a sulphur or a selenium atom, X is an anion and p is 1 in the case of a betaine-like molecular structure of the compound caused by the presence of a sulphonic acid group in $R_4$ and is 2 in the case of a non-betaine-like molecular structure of the compound, together with a sensitising dye of the general formula

II

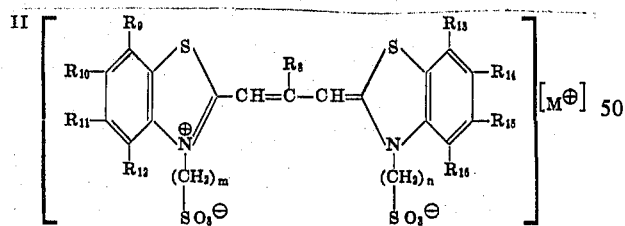

wherein $R_9$–$R_{16}$ are each hydrogen atoms or lower alkoxy groups, $R_8$ is a hydrogen atom or a lower alkyl group, m and n are each integers from 1 – 6 and M is a cation.

Preferably in the dyes of formula I, $R_1$ is a methyl or an ethyl group, $R_5$ is an ethyl group, $R_2$ and $R_3$ are both methoxy groups or are both hydrogen atoms, $R_4$ is a lower alkyl group or a sulpho-lower-alkyl group, Y is a sulphur or selenium atom.

Preferably in the dyes of formula II, $R_9$, $R_{12}$, $R_{13}$ and $R_{16}$ are each hydrogen atoms, $R_{10}$, $R_{11}$, $R_{14}$ and $R_{15}$ are each hydrogen atoms or methoxy or ethoxy groups and m and n are each 3 or 4 and M is an alkali metal or piperidine.

Most preferably the dyes of formula II are symmetrical dyes.

The dyes of formula II are isolated as salts.

By lower alkyl, substituted lower alkyl and lower alkoxy is meant that the alkyl protion of the group comprises from one to four carbon atoms.

Preferably 0.01 g to 0.5 g of each sensitising dye of formula I and II per 1.5 g moles of silver present in the emulsion can be conveniently used.

By use of the combination of sensitising dyes as just set forth a valuable effect is obtained and is illustrated by the specific Example.

In the Example which follows the following dyes of formula I were used:

A. (5,7,8-Trimethoxy-1-methylnaphtho[1,2-d]thiazole-2)(5bromo-3-ethyl--2-benzothiazole)-β-ethyltrimethincyanine bromide which has the formula:

(A)

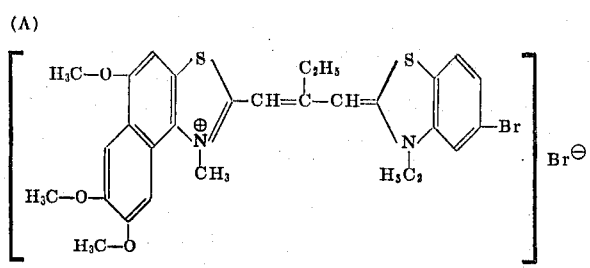

B. (5-Methoxy-1-methylnaphtho[1,2-d]thiazole-2)(3-ethyl-5-methyl-2-benzoselenazole)-β-ethyl-trimethincyanine iodide which has the formula:

(B)

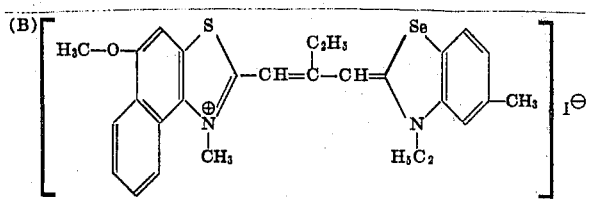

C. Anhydro-(5,7,8-trimethoxy-1,3'-sulphopropylnaphtho[1,2d]thiazole-2)(3-methyl-2-benzoselenazole)-β-ethyltrimethincyanine hydroxide which has the formula:

(C)

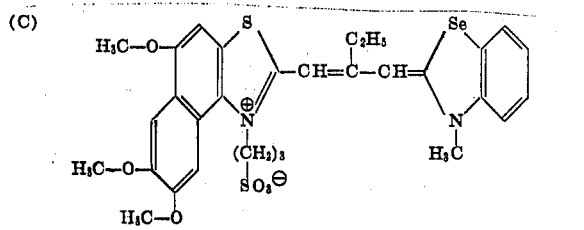

D. Anhydro-(5-ethoxy-7,8-dimethoxy-1-3'-sulphopropylnaphtho[1,2d]thiazole-2)(3-ethyl-2-benzoselenazole)-β-ethyl-trimethincyanine hydroxide which has the formula:

(D) 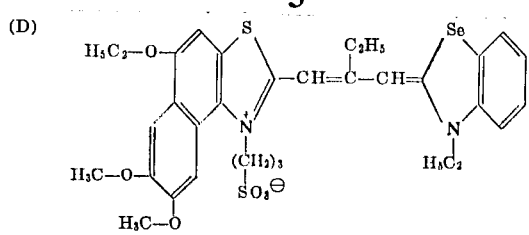

and the following dye of formula II was used:
1. Anhydro-bis-(5-methoxy-3,4'-sulphobutyl-2-benzothiazole)trimethincyanine hydroxide, piperidine salt, which has the formula:

(1) 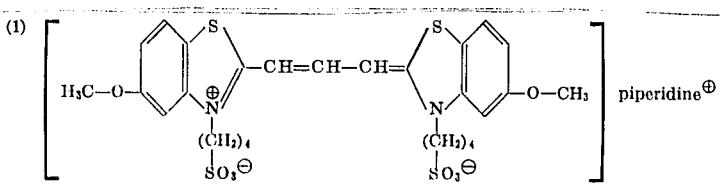 piperidine$^{\oplus}$

2. Anhydro-bis-(5-methoxy-3,3'-sulphopropyl-2-benzothiazole) β-methyl-trimethincyanine hydroxide sodium salt which has the formula:

(2) 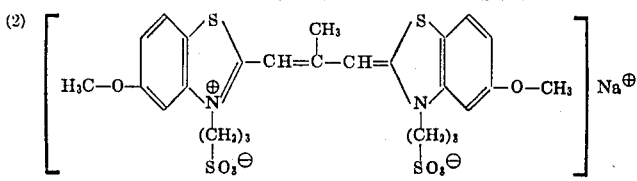 Na$^{\oplus}$

3. Anhydro-bis(6-methoxy-3,4'-sulphobutyl-2-benzothiazole) β-ethyl-trimethincyanine hydroxide sodium salt, which has the formula:

(3) 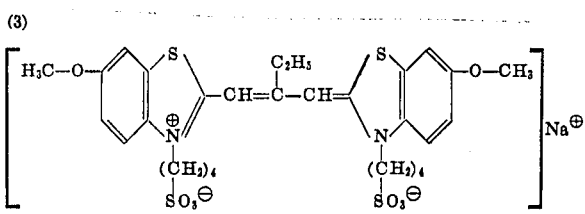 Na$^{\oplus}$

4. Anhydro-bis-(5-ethoxy-3,4'-sulphobutyl-2-benzothiazole) trimethincyanine hydroxide, piperidine salt, which has the formula:

(4) 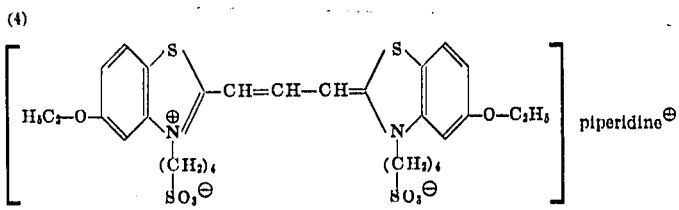 piperidine$^{\oplus}$

EXAMPLE

The above Dyes A, B, C, D, 1, 2, 3 and 4 were added to portions of a high speed silver iodobromide emulsion containing 5.4 mol per cent of silver iodide, before digestion of the emulsion, the quantity shown for each dye being the amount per 1.5 g moles of silver halide, each portion was coated onto a film strip. After exposure the strips were developed and the relative log speed of the emulsions were determined. The speeds are relative log speeds measured to light passing through a suitable filter, the term 'relative log speed' being directly related to the logarithm of the reciprocal of the exposure in metre-candle-seconds required to produce a density of 0.1 above fog. A higher figure indicates a higher speed. The filters used were minus blue, No. 204 of the Ilford Colour Filters Handbook.

TABLE

| Dye | mg. | Dye | mg. | Relative Log Speeds Red | Minus Blue |
|---|---|---|---|---|---|
| A. | 100 | — | | 4.16 | 4.35 |
| A. | 150 | — | | 4.21 | 4.37 |
| | — | 1. | 150 | 4.32 | 4.67 |
| | 150 | | 150 | 4.44 | 4.71 |
| B. | 50 | — | | 3.81 | 4.03 |
| | 100 | — | | 3.99 | 4.21 |
| | 150 | — | | 4.06 | 4.32 |
| | — | 1. | 100 | 4.21 | 4.63 |
| | — | | 150 | 4.25 | 4.68 |
| | 50 | | 100 | 4.41 | 4.73 |
| A. | 100 | — | | 4.40 | 4.54 |
| | 150 | — | | 4.44 | 4.54 |
| | — | 2. | 100 | 4.86 | 5.12 |
| | — | | 150 | 4.80 | 5.10 |
| | | | 100 | 5.08 | 5.24 |
| C. | 150 | — | | 4.34 | 4.46 |
| | — | 3. | 200 | 4.12 | 4.44 |
| | | | 150 | 3.76 | 4.34 |

TABLE—Continued

| Dye | mg. | Dye | mg. | Relative Log Speeds Red | Minus Blue |
|---|---|---|---|---|---|
| * | 150 | | 150 | 4.49 | 4.66 |
| A. | 150 | | — | 4.44 | 4.54 |
| | — | 3. | 150 | 3.90 | 4.44 |
| | — | | 200 | 4.12 | 4.44 |
| * | 150 | | 150 | 4.86 | 5.01 |
| C. | 150 | | — | 4.08 | 4.14 |
| | — | 2. | 100 | 4.72 | 4.96 |
| | — | | 150 | 4.90 | 5.14 |
| * | 150 | | 150 | 5.01 | 5.19 |
| D. | 150 | | — | 4.59 | 4.71 |
| | — | 2. | 100 | 4.72 | 4.96 |
| | — | | 150 | 4.90 | 5.14 |
| * | 150 | | 100 | 4.96 | 5.20 |
| D | 150 | | — | 4.59 | 4.71 |
| | — | 4. | 100 | 4.52 | 4.76 |
| | — | | 200 | 4.73 | 5.00 |
| | 50 | | 100 | 4.77 | 5.11 |
| * | 100 | | 200 | 4.87 | 5.18 |

These quantities were found to be the optimum amounts for the mixture. Higher or lower quantities of dyes gave lower speeds.

These results show that when a combination of a dye of formula I and a dye of formula II are present together in a silver halide emulsion a useful increase in red speed of the emulsion is obtained.

Further when the combination of a dye of formula I and formula II are present together in a photographic silver halide emulsion, the resultant spectral distribution is more uniform between 520 and 660 nm than is the distribution of the dyes used alone. This is shown in the accompanying FIGS. 1 and 2.

Figure 1:
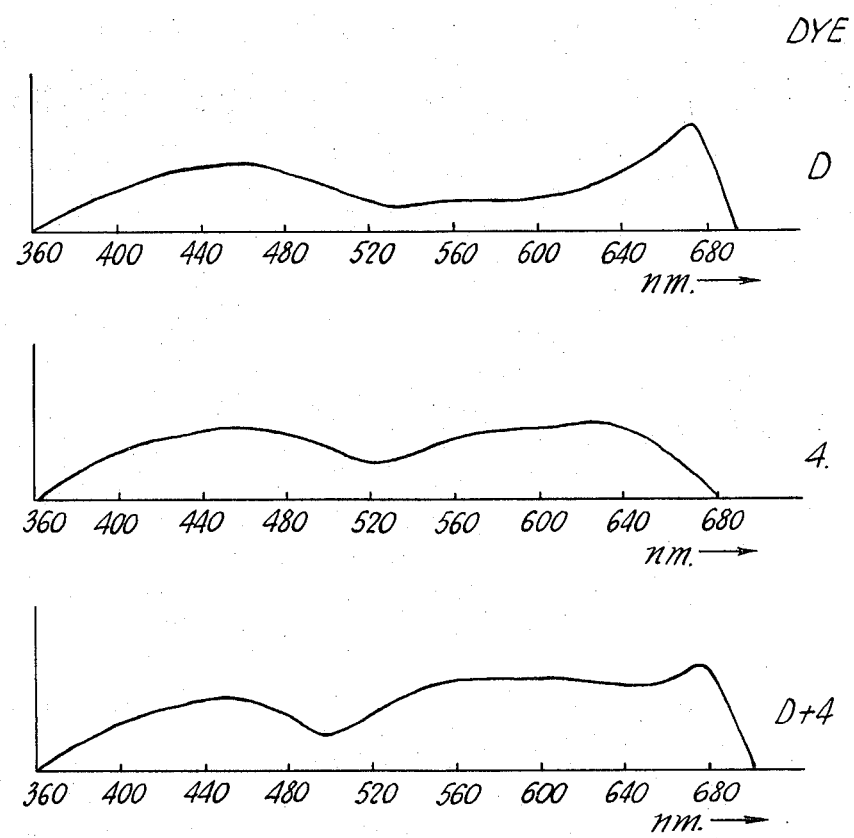
FIG. 1 shows the spectral distribution of a silver halide emulsion which comprises dye D alone, dye 4 alone and of dyes D and 4 together.
Figure 2:
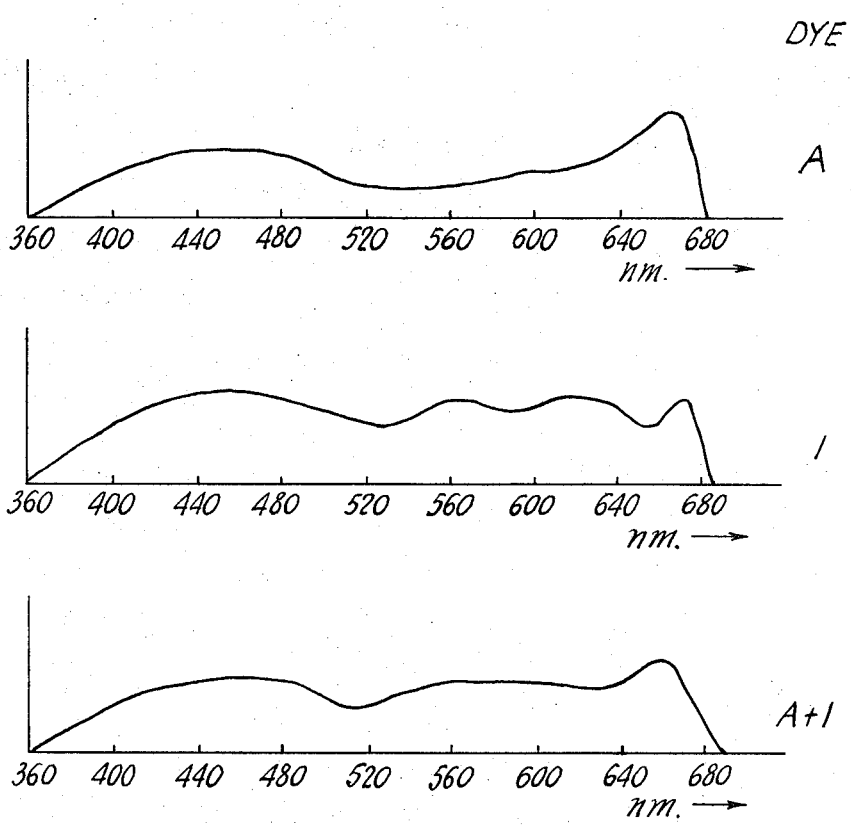
FIG. 2 shows the spectral distribution of a silver halide emulsion which comprises dye A alone, dye 1 alone and dyes A and 1 together.

The improved result when a combination of a dye of formula I and a dye of formula II are present together in a silver halide emulsion is thus demonstrated.

What we claim is:

1. A photographic silver halide emulsion which comprises a super-sensitising combination which consists of a sensitising dye of the general formula

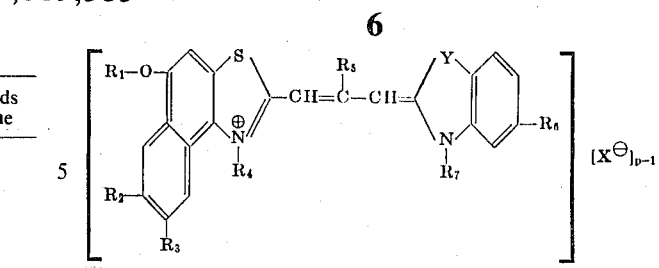

wherein $R_1$, $R_5$ and $R_7$ are each lower alkyl groups, $R_2$ and $R_3$ are each hydrogen atoms or lower alkoxy groups, $R_6$ is a hydrogen, chlorine or bromine atom or a lower alkyl group, $R_4$ is a lower alkyl group or a sulpho lower alkyl group, Y is a sulphur or a selenium atom, X is an anion and $p$ is 1 in the case of a betaine-like molecular structure of the compound caused by the presence of a sulphonic acid group in $R_4$ and is 2 in the case of a non-betaine-like molecular structure of the compound, together with a sensitising dye of the general formula:

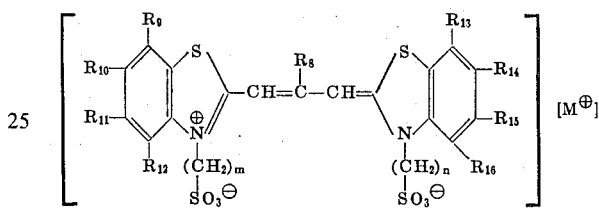

wherein $R_9 - R_{16}$ are each hydrogen atoms or lower alkoxy groups, $R_8$ is a hydrogen atom or a lower alkyl group, $m$ and $n$ are each integers from 1 – 6 and M is a cation.

2. A photographic emulsion according to claim 1, wherein in the dye first set forth therein $R_1$ is a methyl or an ethyl group, $R_5$ is an ethyl group, $R_2$ and $R_3$ are both methoxy groups or are both hydrogen atoms, $R_4$ is a lower alkyl group or a sulpho-lower-alkyl group, Y is a sulphur or selenium atom.

3. A photographic emulsion according to claim 1, wherein in the dye last set forth therein $R_9$, $R_{12}$, $R_{13}$ and $R_{16}$ are each hydrogen atoms, $R_{10}$, $R_{11}$, $R_{14}$ and $R_{15}$ are each hydrogen atoms or methoxy or ethoxy groups and $m$ and $n$ are each 3 or 4 and M is an alkali metal or piperidine.

4. A photographic silver halide emulsion according to claim 1 which comprises 0.01 to 0.5 g of each dye per 1.5 moles of silver present in the emulsion.

* * * * *